Sept. 4, 1923.  E. F. NICHOLS  1,466,915
SUBMARINE MINE
Filed Nov. 27, 1918   2 Sheets-Sheet 1
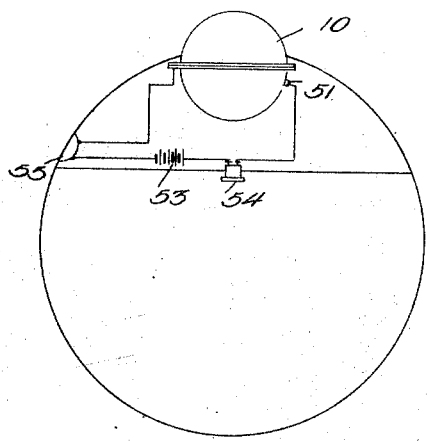
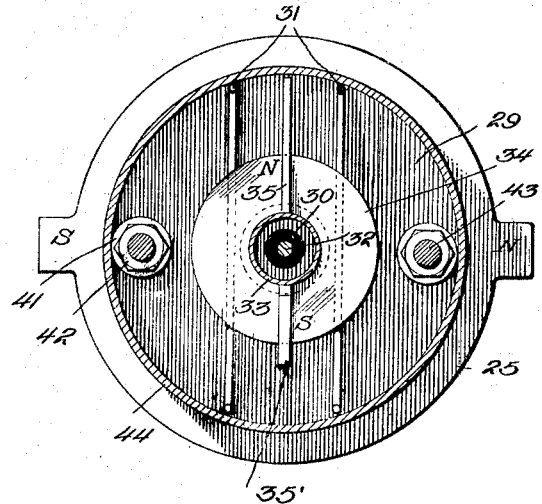
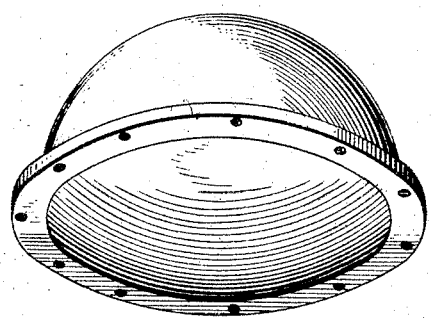
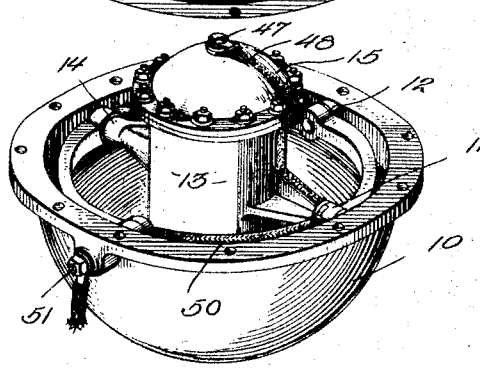
Inventor
E. F. Nichols Sept. 4, 1923.  E. F. NICHOLS  1,466,915
SUBMARINE MINE
Filed Nov. 27, 1918   2 Sheets-Sheet 2

Patented Sept. 4, 1923.

1,466,915

UNITED STATES PATENT OFFICE.

ERNEST FOX NICHOLS, OF NEW HAVEN, CONNECTICUT, ASSIGNOR TO GOVERNMENT OF THE UNITED STATES, REPRESENTED BY THE SECRETARY OF THE NAVY.

SUBMARINE MINE.

Application filed November 27, 1918. Serial No. 264,454.

*To all whom it may concern:*

Be it known that I, ERNEST FOX NICHOLS, a citizen of the United States, residing at New Haven, Connecticut, have invented new and useful Improvements in Submarine Mines, of which the following is a specification.

This invention relates to magnetic responsive devices, and particularly to that type of device which is magnetically actuated by changes in the intensity of the magnetic field acting upon the same, these changes being due to local disturbances caused by a magnetic body (a vessel, for instance) moving in the field acting upon the instrument. Before describing my improved device and the application thereof in detail, it may be well to briefly describe the general principles in accordance with which it operates.

It may be stated that when two magnetized needles, discs or rings are pivoted independently, one vertically above the other, each magnet is acted upon by two forces; first, the horizontal component of the earth's magnetic field tending to set the magnetic axes of the magnets in the magnetic meridian with north seeking pole magnetic north; second, the repulsive force between like magnetic poles tending to set the north pole of one magnet over the south pole of the other. The horizontal component of the earth's magnetic field is within broad limits independent of the distance between the magnets while the force due to repulsion of like poles varies rapidly with this distance of separation. If we begin with the magnets far enough apart so that their repulsive force is insignificant, both magnets will set themselves in the magnetic meridian with their north seeking poles magnetic north. As the distance separating the magnets is diminished and the repulsive force thereby increased, the north seeking poles of the two magnets are deviated on opposite sides from the magnetic meridian, and the two magnets form an angle, the magnitude of which corresponds to the position of balance of the forces acting. If the two magnets have different magnetic moments, the magnetic axis of the weaker magnet in the equilibrium position forms the larger angle with the magnetic meridian. As the vertical distance separating the centers of the magnets is steadily diminished, the angle between the magnetic axes of the two magnets increases from zero to 180°. When the axes of the two magnets form an angle between these limiting values, any variation in the horizontal intensity of the earth's magnetic field, due to a local magnetic disturbance, will increase or diminish the angle of separation. If the force due to the local disturbance is in the same direction as the horizontal component of the earth's magnetic force, the angle of separation will be diminished. If the local force is opposed to that of the horizontal component of the earth's magnetic field, the angle will increase. An angle of 90° between the two needles represents the position of greatest magnetic and mechanical stability for the system.

In the present disclosure of my invention, I have shown my improved device as being employed as a trigger actuating mechanism for firing a submarine mine, the trigger mechanism being actuated by the approach of a magnetic body, such as a vessel, to thereby complete an electric circuit or so actuate co-operating means as to produce the firing of the mine at the desired moment, but it is to be understood that the present disclosure is merely illustrative of my invention and not restrictive thereof, and that my improved device is adapted to other uses than that shown. My improved device may be used generally to detect or determine the position of a magnetic body, such as a submarine or other steel or iron ships or deposits of magnetic ore bodies or bring about a certain result upon instrumentalities associated with my device and forming an extension of it.

With this understanding of the broader aspect of the invention in mind, it may be stated that the present invention is designed to embody such features of construction in a simple and practical magnetic responsive device which will be entirely reliable and efficient in operation.

It is also an object of the present invention to provide a magnetic responsive device which, when used in a mine of the above general character, is adapted to withstand the rough handling of transportation and planting, as well as the effect of water currents, eddies and storms after being planted, without danger of disturbing the mechanism. A further object is to provide a magnetic responsive device which, when used as the trigger mechanism of a mine, cannot be easily countermined, or have its operativeness disturbed by ordinary countermining operations, thus permitting the detonation of high explosives in its close proximity without operating said trigger or in any way injuring or changing the adjustment and magnetic or mechanical balance of any of its component parts.

Other objects will be in part obvious from the annexed drawings, and in part indicated in connection therewith by the following analysis of this invention.

This invention accordingly consists in the features of the design, construction, combination of parts and in the unique relations of the members and in the relative proportioning and disposition thereof; all as more completely outlined herein.

Drawings depicting a preferred form have been annexed as part of this disclosure, and in such drawings, like characters of reference denote corresponding parts throughout all the views, of which:—

Fig. 1 is a sectional view of a sea mine in which my improved device is incorporated, the parts being shown diagrammatically by way of illustration.

Fig. 2 is a perspective view of the trigger mechanism with the upper part of the housing removed.

Fig. 4 is a sectional view taken on line 4—4 of Fig. 3.

Figure 3:
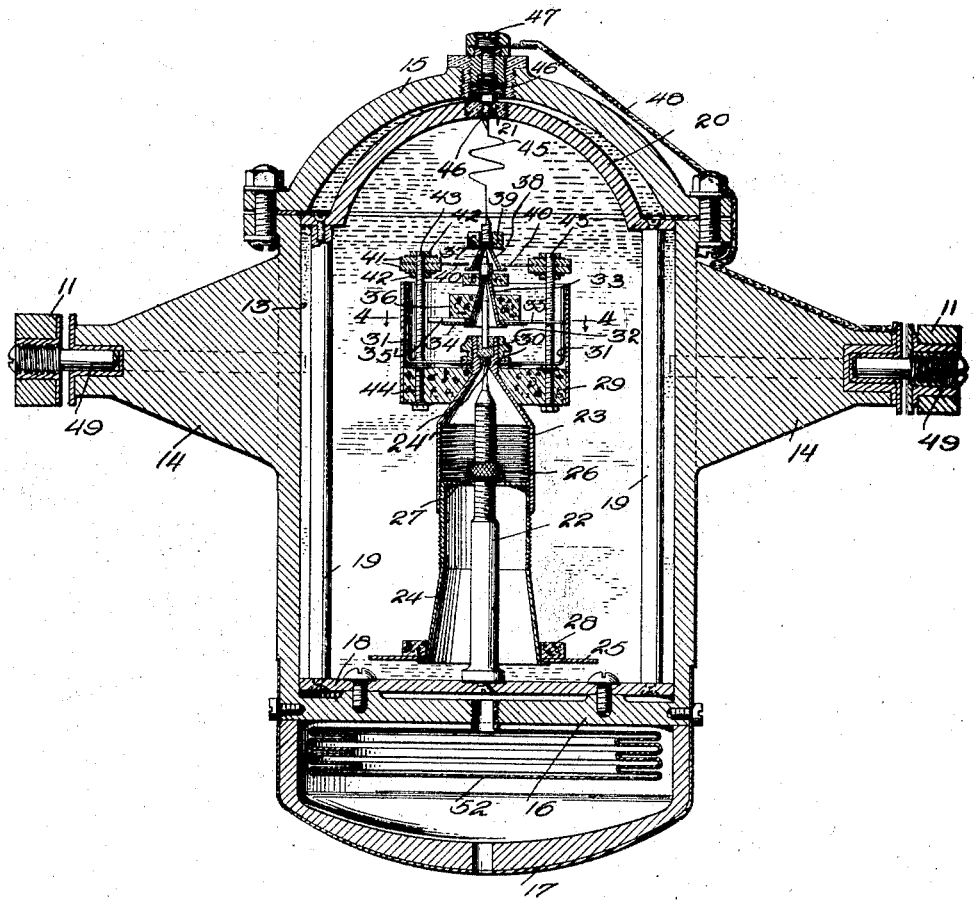
Fig. 3 is a vertical sectional view of the trigger mechanism.

The magnetic responsive device, which is the principal part of the present invention, as it is applicable to various uses, and when used in combination with a submarine mine, any form of non-magnetic mine casing may be employed, comprises generally a two-part spherical housing, or shell 10, of any suitable non-magnetic material, preferably brass or copper; the gimbal ring 11 pivoted in the shell by means of the trunnions 12; and a casing 13 mounted in trunnions 14 transversely to the pivots 12 of the gimbal ring. The parts are suitably counterbalanced to keep a normal horizontal position at all times regardless of the roll of the mine while being launched or after it is submerged due to the action of water currents, eddies, and waves.

The casing 13, which is more clearly shown in vertical section in Fig. 3, is of general cylindrical shape having trunnions 14 in the gimbal ring, as shown and is provided with a removable cover 15 and a false bottom 16. Connected to the bottom of the casing is a hollow lead block 17 which serves as a counterweight to keep the casing in a vertical position. The casing is preferably made of aluminum or other light and non-magnetic material, and is adapted to house the magnetic responsive mechanism, as shown. This mechanism is carried by a non-magnetic base plate 18 mounted on the false bottom 16 of the casing. Arising from the base plate 18 are two or more upwardly projecting rods or other standards 19 carrying an arched or semicircular shaped member 20 having a plug 21 of insulating material at its top, this plug being apertured to receive a terminal, hereinafter described. Extending upwardly from the central part of the base plate 18 is a main pivot post 22, which at its upper end terminates in a metallic pivot point, on which the entire system of magnetic needles is carried. Pivotally carried by the post 22 is an inverted thimble composed of two cylindrically-shaped members 23 and 24 preferably formed of aluminum, or other suitably light non-magnetic material, and adjustably secured together by means of a threaded connection or by a sliding or telescoping joint. The upper part of the member 23 is of conical shape and is adapted to coact with the top of the post 22. The apex of this cone is apertured and a metallic cup jewel 24' inserted which provides a hard polished bearing surface for the pivot point on 22 and at the same time insures electrical contact between 22 and 23 and other metallic parts not electrically insulated therefrom. The lower end of the lower member 24 is provided with a circumferential flange upon which rests a main ring-shaped magnet 25 with projecting rectangular pole pieces as shown in Fig. 4 but, of course, these pole pieces may be omitted. Upon the post 22 is threaded for adjustable movement a nut 26, and the member 24 has at its upper end a flange 27, which is brought into engagement with the nut when the device is turned upside down so that the thimble cannot fall away from the post 22.

The entire mechanism in the casing 13 is immersed in any suitable fluid, kerosene, for instance, for the purpose of damping out all sudden or oscillatory motions of the magnetic system and reducing the effect of any shock from without in causing injury or violent motions of the delicate parts within and thus preventing accidental contact between the members, hereinafter described. The fluid also serves the purpose of acting upon suitable counterbalancing floats 28 and 29 secured to the bottom and top, respectively, of the thimble, thereby to reduce the pressure and friction due to pressure of the thimble and the parts carried thereby upon the pivot point of the post 22 to a minimum.

The upper part of the thimble is provided with a threaded bushing 30, in which are mounted two contact arms 31 spaced apart any suitable distance and extending parallel to each other across the upper surface of the float 29. It will be noted that the opposite ends of each of these contact arms are bent upward and extend equal distances from the center of the float, so that the entire mass is accurately balanced about the axis of the thimble. The distance separating these two contacts 31 in a way controls the effectiveness of the mine, in that if the contacts are relatively close together, the movement of the secondary magnet, hereinafter described, need not be great to cause contact with one of the arms and the magnetic responsive device requiring thus a smaller magnetic disturbance to cause contact will have a greater radius of effective action, while an increase of the distance between the arms will require a greater movement of the secondary magnet, thereby decreasing the firing range of the mine.

The bushing 30 at the top of the thimble carries a metallic jewel bearing above which is an insulating plug, in which latter a second pivot 32 is fastened. This pivot carries a conical member 33 provided with a second ring magnet 34 bearing a contact arm 35. The member 35' is employed as a counterpoise for the arm 35. A float 36 is associated with the cap 33 thereby to increase its buoyancy and reduce the friction between the pivot point 32 and its bearing to a minimum. The metallic contact arm 35 carried around by magnet 34 is normally positioned between the two contact arms 31, and when affected by a magnetic body is swung to one side or the other, according to the polarity of the affecting magnetic body.

The cap 33 carries a third pivot point 37, upon which rests a conical cap 38 provided with a metallic jewel bearing, a float 39 and a lateral circumferential flange at its lower end adapted to coact with a guard washer 40 carried between cork discs 41, adjustably secured by the nuts 42 upon threaded studs 43, passing through the float 29. It will be seen from this description and the drawings that the entire mechanism may be turned upside down, and while the pivots and jewel bearings will then separate slightly all the movable parts will return at once to normal position when the mechanism is again righted.

Carried by the float 29, and surrounding the mechanism carried thereby, is a cylindrical sleeve 44 which serves to prevent movement of the immersion liquid external to the sleeve from affecting the secondary magnet 34 and the parts carried thereby. With this construction, while currents may be set up in the liquid within the casing 13 by lateral or rotational movement of the entire device due to waves, eddies or currents in the stream in which it is planted, these liquid motions cannot be communicated to the parts within the sleeve 44.

The top cap 38 is connected electrically by means of a very light spiral flexible wire 45 to a terminal 46 extending through the plug 21 in the arch 20. The circuit is completed through a spiral spring 46', an insulated contact member 47 carried by the top of the casing 13, and a wire 48 passing along one of the trunnions 14 and electrically connected to a pin 49 insulated from the trunnion 14 and the gimbal ring 11. A wire 50, as clearly shown in Fig. 2, passes along a quadrant of the gimbal ring to an insulated binding post 51 carried by a shell 10.

In the lead block 17 is a sylphon 52 communicating with the interior of the casing 13, and this sylphon serves the purpose of permitting expansion and contraction of the floatation fluid within the casing due to changes in temperatures. However, this sylphon may be omitted inasmuch as the entire shell 10 is also filled with the same fluid, and by leaving a very small space, or air pocket, at the top of the liquid in the shell 10 and a capillary hole in casing 13 the expansion and contraction of the fluid can be taken care of without affecting the normal operation of the device.

The liquid filling the shell 10 serves the additional twofold purposes of preventing shocks from being transmitted to the casing 13 and the parts therein and of damping out rapidly any oscillations of the casing 13 upon its gimbal trunnions.

After the parts of the trigger mechanism are assembled, as shown in Fig. 3, and the interior of the casing 13 and the shell 10 are filled with a floatation fluid, it may be placed in a submarine mine and electrically connected to the batteries 53 and the detonator 54, shown conventionally in Fig. 1. From Fig. 1 it will be seen that one of the wires of the circuit is connected to the binding post 51, and the other wire is directly connected to one of the bolts securing the two parts of the shell 10 together. Any suitable form of safety device may be associated with the circuit, such, for example, as a soluble bushing 55, shown conventionally in Fig. 1, which bushing would prevent the closing of the circuit until after the mine has been submerged for any desired length of time, thus giving the launching boat an opportunity to get safely away from the mine field whereby its own magnetic action or the violent motions of the mine in the process of planting could not prematurely discharge the same.

At any desired interval of time after launching, the mine becomes automatically armed, and the approach of a magnetic metallic body, such as a submarine, for example, would have an effect upon the magnets 25 and 34, which may be of equal or different magnetic moments, thereby causing a relative rotation of one magnet with respect to the other, which would bring the contacts 35 and 31 into engagement. As soon as this contact is made, the circuit is closed through the battery, which will explode the detonator and the charge actuated thereby.

It is, of course, understood that the contact arm 35 is connected to one side of the battery through the cap 33, pivot point 37, cap 38, wire 45, terminal 46, spring 46', plug 47 and the wire 48, while contact arms 31 are connected to the other side of the battery through the bushing 30, pivot point 22, plate 18, the walls of the casing 13, the trunnion 14 thereof, gimbal ring 11 and shell 10.

The entire system of magnets is carried by the skeleton frame, formed of the base plate 18, rods 19, and the arch 20, and this is of particular advantage as it facilitates the operation of assembling the parts, in that the parts of the trigger mechanism may be brought together upon the base plate 18, and then after the parts are assembled and adjusted, the skeleton frame, together with the parts carried thereby, may be inserted through the top of the casing 13, and then the cover 15 of the casing clamped into place. The casing is filled with the liquid by pouring the latter through the opening which receives the screw 47.

While for the sake of convenience of representation the poles of the small magnet 34 are shown in Fig. 3 as normally being in the same vertical plane as the poles of the larger magnet 25, in actual practice the magnetic axes of the two magnets are at right angles, as clearly shown in Fig. 4. When the magnets are in this position, the greatest magnetic and mechanical stability for the system is obtained.

From the foregoing description and the drawings, it will be noted that the entire magnetic system is supported upon a single pivot, and this in addition to the gimbals, insures the maintenance of the system on a vertical axis and the holding of the magnets in horizontal planes. All mechanical disturbances, such as violent explosions in close proximity to the magnetic responsive device reach the system of magnets through but one point, namely, the pivot point of the post 22, and consequently suitable adjustment of the centers of gravity and buoyancy makes it possible to guard against outside motions disturbing the movable parts of the system. It will be seen from Fig. 3 that the pivot point of the post 22 on which the entire system of magnets is supported is at the intersection of the gimbal axes; that is to say, it is in alignment with the pins 49 on which the casing 13 is trunnioned and also in line with the trunnions 12 on which the gimbal ring 11 is pivoted. It will be understood that with this arrangement, when the casing 13 is rotated from an upright to an inclined position by water currents, eddies, or the like, the pivot point of the post 22 being at the center of the gimbal system, will remain substantially stationary and therefore the system of magnets will not be disturbed to any appreciable extent. Should the casing 13 become inclined at an angle to the perpendicular, the post 22 would of course be also inclined but the pivot point of this post would remain, as stated, substantially stationary and the thimble 23, together with the system of magnets carried thereby, would remain substantially vertical.

By immersing the parts of the magnetic system in a fluid, and providing means for floating of the parts, pivot friction is reduced to a minimum, damping out of mechanical vibrations is obtained, and damage to pivots and jewels by sudden shock is guarded against. Each separate assembly or unit of parts of the magnet system is provided with separate and independent floatation means so that each part is maintained at all times, and irrespective of any rolling movement of the mine, in a horizontal position. The floats have large surfaces and the friction between the surfaces of these floats and the fluid in which they are immersed aids in damping the movement of the magnets.

Since but a single pivot support for the system of magnets is provided, there being no bearing for the upper end of this system, the cap or terminal unit 38 is provided, this cap being connected to the fixed terminal 46 by means of the flexible wire 45 to complete the electrical circuit through the system of magnets. When relative rotation occurs between the unit carrying the magnet 34 and the casing 13, no torques are transmitted to the magnet 34 as the cap 38 is freely pivoted on the pivot member 37 and takes care of all torques set up in the wire 45. The flexible wire 45 may be of spiral or other serpentine form so that it may be extended to permit relative rectilinear movements between the casing 13 and the system of magnets.

In accordance with the present invention, the buoyancy provided by the float members is increased until each unit of the magnetic system is as near the specific gravity of the immersion fluid as restricting conditions permit, that is to say, the specific gravity of each of these units is but slightly greater than the specific gravity of the immersion fluid. The center of buoyancy of each of the units of the system is near the center of gravity of the respective units, and the center of buoyancy of the magnetic system, taken as a whole, is as near the center of gravity of the entire system as will insure the system remaining in an upright position. The center of buoyancy of the system is preferably immediately above the center of gravity of the system. Since enough floatation is added to the buoyancy of each unit of the system to render its specific gravity only slightly greater than the specific gravity of the immersion fluid, the fluid and the magnetic system will move substantially in unison; that is to say, if the casing 13 together with the immersion fluid therein, is subjected to any rectilinear accelerated movement, the system of magnets will not tend to lag behind nor move forward more rapidly than the immersion fluid itself. This provision is especially effective in protecting the magnet system in whole and in part from being disturbed by sudden shocks or impulsive accelerations imposed upon the shell 10 and casing 13 from without. By constructing the system so that the center of buoyancy is slightly above, but as near to the center of gravity as will insure the members remaining in an upright position, the position of the meta-centers are such that the system is always stable.

Without further analysis, the foregoing will sufficiently reveal the gist of this invention that others can by applying current knowledge readily adapt it for various applications without omitting certain features that, from the standpoint of the prior art, fairly constitute essential characteristics of the generic or specific aspects of this invention, and therefore such adaptations should and are intended to be comprehended within the meaning and range of equivalency of the following claims.

What I claim is:

1. In combination with a submarine mine, a firing device therefor comprising a detonator, a plurality of independently pivoted magnetic units adapted to have relative angular movements, contacts associated therewith in circuit with said detonator, a fluid in which said units are immersed, and a buoyancy member associated with each unit.

2. In combination with a submarine mine, a firing device therefor comprising a detonator, a plurality of independently pivoted magnetic units, contacts associated with said units and in circuit with said detonator, a fluid in which said units are immersed, and a buoyancy member associated with each unit, the buoyancy of each of said units being such that its specific gravity is but slightly greater than the specific gravity of the immersion fluid.

3. In combination with a submarine mine, a firing device therefor comprising a detonator, a plurality of independently pivoted magnetic units, contacts associated with said units and in circuit with said detonator, a chamber filled with a fluid in which said units are immersed, and a buoyancy member associated with each unit, the center of buoyancy of the system of magnetic units being slightly above the center of gravity of said units thereby to insure the system remaining in upright position.

4. In combination with a submarine mine, a firing device therefor comprising a detonator, a unit mounted on a pivot, and having a second pivot which in its normal position is in axial alignment with said first pivot, a second unit on said pivot, a fluid in which said units are immersed, and separate buoyancy means for each unit, the specific gravity of each of said complete units being but slightly greater than the specific gravity of the immersion fluid and the centers of buoyancy of each of said units as well as the whole system of units combined being slightly above but as near the centers of gravity of each unit or said system of units combined as will insure the system remaining in an upright position and contacts carried by said units and in circuit with said detonator.

5. In combination with a submarine mine, a firing device therefor comprising a detonator, a chamber, a pair of magnets each on its own pivot and free to rotate independently of the other, said magnets being arranged one above the other, contacts associated with each magnet and in circuit with said detonator, a fluid in which said magnets are immersed, and a buoyancy member associated with each of said magnets.

Signed at Washington, District of Columbia, this 2nd day of October, 1918.

ERNEST FOX NICHOLS.